US011378210B2

(12) United States Patent
Hartmann et al.

(10) Patent No.: US 11,378,210 B2
(45) Date of Patent: Jul. 5, 2022

(54) METHOD FOR CONNECTING A CONNECTION SECTION OF A TUBE FOR FLUID OR GASEOUS MEDIA WITH A PLUG CONNECTOR

(71) Applicant: Henn GmbH & Co KG., Dornbirn (AT)

(72) Inventors: Harald Hartmann, Dornbirn (AT); Christian Moosbrugger, Bezau (AT)

(73) Assignee: Henn GmbH & Co KG., Dornbirn (AT)

( * ) Notice: Subject to any disclaimer, the term of this patent is extended or adjusted under 35 U.S.C. 154(b) by 926 days.

(21) Appl. No.: 16/095,758

(22) PCT Filed: Jul. 28, 2016

(86) PCT No.: PCT/AT2016/060022
§ 371 (c)(1),
(2) Date: Oct. 23, 2018

(87) PCT Pub. No.: WO2017/193145
PCT Pub. Date: Nov. 16, 2017

(65) Prior Publication Data
US 2021/0220899 A1    Jul. 22, 2021

(30) Foreign Application Priority Data

May 9, 2016    (AT) .............................. A 50425/2016

(51) Int. Cl.
*F16L 33/213*    (2006.01)
*F16L 37/088*    (2006.01)
(Continued)

(52) U.S. Cl.
CPC .......... *F16L 33/213* (2013.01); *B21D 39/046* (2013.01); *B21D 39/048* (2013.01);
(Continued)

(58) Field of Classification Search
CPC . B21D 38/046; B21D 38/20; Y10T 29/49911; Y10T 29/4994
See application file for complete search history.

(56) References Cited

U.S. PATENT DOCUMENTS 2,181,673 A    11/1939    Tompkins
4,152,821 A *  5/1979    Scott .................... B21D 39/206
                                                        29/237

(Continued)

FOREIGN PATENT DOCUMENTS

AT    509 196 B1    7/2011
AT    511 705 B1    2/2013
(Continued)

OTHER PUBLICATIONS

International Search Report of PCT/AT2016/060022, dated May 19, 2017.

*Primary Examiner* — Jason L Vaughan
(74) *Attorney, Agent, or Firm* — Collard & Roe, P.C.

(57) ABSTRACT

The invention relates to a method for connecting a connection section (33) of a hose (3) with a plug-in connector (4). The plug-in connector (4) comprises a connector body (6), which connector body (6) has a ring space (22).
In a first method step, the connection section (33) is pushed into the ring space (22) of the plug-in connector (4) of the hose (3) from the hose accommodation side (25) of the connector body (6), and positioned there;
in a second method step, a pressing tool (50) deforms the first mantle section (12) of the connector body (6).
The second mantle section (15) has a narrowing (39) at a front edge (38) of the hose accommodation side (25), whereby it is ensured that the connection section (33) of the hose (3) is freely deformed in the direction of the second mantle section (15) during the pressing process, at least in the region of the ring space (22) that is at a distance from the
(Continued)

front edge (38), before the connection section (33) of the hose (3) comes to lie against the second mantle section (15).

7 Claims, 6 Drawing Sheets

(51) Int. Cl.
 *B21D 39/04*  (2006.01)
 *F16L 13/14*  (2006.01)
 *F16L 17/025*  (2006.01)
 *B21D 39/20*  (2006.01)

(52) U.S. Cl.
 CPC ........... *F16L 13/147* (2013.01); *F16L 17/025* (2013.01); *F16L 37/088* (2013.01); *F16L 37/0885* (2019.08); *B21D 39/20* (2013.01); *Y10T 29/49911* (2015.01)

(56) References Cited

U.S. PATENT DOCUMENTS

| | | | |
|---|---|---|---|
| 5,112,087 A | | 5/1992 | Haruki |
| 5,177,854 A | * | 1/1993 | Herbert, Jr. .......... G03G 15/751 |
| | | | 29/895.212 |
| 8,714,601 B2 | * | 5/2014 | Kawamata ............ F16L 23/024 |
| | | | 285/382.4 |
| 8,814,234 B2 | * | 8/2014 | Kokubo .................. B60R 19/34 |
| | | | 293/133 |
| 10,137,492 B2 | * | 11/2018 | Dannheisig .............. C21D 1/42 |
| 2003/0111839 A1 | | 6/2003 | Fraser |
| 2011/0215573 A1 | * | 9/2011 | Tanaka .................... F01N 13/08 |
| | | | 29/523 |
| 2017/0082229 A1 | | 3/2017 | Meissner |
| 2017/0146159 A1 | | 5/2017 | Hartmann |

FOREIGN PATENT DOCUMENTS

| | | |
|---|---|---|
| CA | 2 008 892 A1 | 8/1990 |
| CN | 1046967 A | 11/1990 |
| CN | 1051237 A | 5/1991 |
| CN | 1430007 A | 7/2003 |
| DE | 201 11 280 U1 | 5/2002 |
| DE | 103 47 927 A1 | 5/2005 |
| DE | 10 2007 042 606 A1 | 3/2009 |
| DE | 10 2013 108 442 A1 | 2/2015 |
| DE | 10 2015 115 890 A1 | 3/2017 |
| EP | 1 321 704 A2 | 6/2003 |
| EP | 2 607 764 A1 | 6/2013 |
| WO | 2009/094679 A1 | 8/2009 |
| WO | 2015/161333 A1 | 10/2015 |

\* cited by examiner

METHOD FOR CONNECTING A CONNECTION SECTION OF A TUBE FOR FLUID OR GASEOUS MEDIA WITH A PLUG CONNECTOR

CROSS REFERENCE TO RELATED APPLICATIONS

This application is the National Stage of PCT/AT2016/060022 filed on Jul. 28, 2016, which claims priority under 35 U.S.C. § 119 of Austrian Application No. A 50425/2016 filed on May 9, 2016, the disclosure of which is incorporated by reference. The international application under PCT article 21(2) was not published in English.

The invention relates to a method for connecting a connection section of a hose for liquid or gaseous media with a plug-in connector, as well as the plug-in connector and a plug module with the hose and the plug-in connector.

A method for connecting an end section of a line for liquid or gaseous media with a plug-in connector is known from AT 509 196 B1. In this regard, the line for liquid or gaseous media is a soft-elastic plastic hose. During the connection method, a first wall section of the plug-in connector is deformed in the direction toward the second wall section, using a pressing tool, with deformation of the end section of the line, which lies between the first and a second wall section of the plug-in connector. Before deformation and/or during deformation of the first wall sections, a surface of the line that faces a window opening, which window opening is disposed in the first or second wall section, is detected using at least one distance measurement device, and the deformation of the first wall section is carried out as a function of the result of the detection of the surface of the end section of the line carried out by the distance measurement device. Both the first and the second wall section of the plug-in connector have a cylindrical wall surface, whereby a hollow cylindrical ring space is formed, in which the line can be accommodated.

The method for connecting the end section of a line with the plug-in connector, or the embodiment of the plug-in connector as presented in AT 509 196 B1, has the disadvantage that the current pressing process or the required degree of pressing can be only insufficiently monitored.

Further methods for fixation of a plug-in connector in an end region of a line are known from AT 511 705 B1 and WO 2015/161333 A1.

It was the task of the present invention to overcome the disadvantages of the state of the art and to make available an apparatus and a method, by means of which an improved connection between a hose and a plug-in connector can be produced.

This task is accomplished by means of an apparatus and a method in accordance with the claims.

According to the invention, a method for connecting a connection section of a hose for liquid or gaseous media with a plug-in connector is provided, wherein the plug-in connector comprises a connector body, which connector body has a ring space, which space is formed by a sleeve-shaped first mantle section, which section surrounds a central longitudinal axis of the plug-in connector in ring shape, in cross-section, and a sleeve-shaped second mantle section of the plug-in connector, which section surrounds a central longitudinal axis of the plug-in connector in ring shape, in cross-section. The first mantle section is surrounded by the second mantle section, and the mantle sections are open toward one another at a second end section, and thereby a hose accommodation side of the connector body is formed.

In a first method step, the connection section of the hose is pushed into the ring space of the plug-in connector from the hose accommodation side of the connector body and positioned there;

In a second method step, a pressing tool deforms the first mantle section of the connector body, while simultaneously deforming the connection section of the hose that lies between the first mantle section and the second mantle section, in the direction toward the second mantle section, and thereby the connection section of the hose is clamped between the first mantle section and the second mantle section. The second mantle section has a narrowing at a front edge of the hose accommodation side, and thereby it is ensured that during the pressing process, the connection section of the hose is freely deformed in the direction of the second mantle section, at least in the region of the ring space that is at a distance from the front edge, before the connection section of the hose comes to lie against the second mantle section.

It is an advantage of the method according to the invention that it is ensured, by means of the narrowing, that the connection section of the hose is freely deformed, during the pressing process, at least in the region of the ring space at a distance from the front edge, in the direction of the second mantle section, before the connection section of the hose comes to lie against the second mantle section. In this way, the result can be achieved that a wall thickness of the hose can be detected during the pressing process. Furthermore, by means of this measure the location of the surface of the hose can be precisely detected, so that during the pressing process, it is possible to continuously monitor when the outer mantle surface of the hose comes to lie against the inner mantle surface of the second mantle section. As a result, the pressing quality between hose and connector body can be monitored, and a uniform result of pressing can be achieved in series production. This possibility of monitoring the degree of pressing of the hose only occurs if the hose can be freely deformed, during the pressing process, at least in an initial stage of pressing, in the direction of the second mantle section. This can be ensured by means of the narrowing, since hoses having an overly large outside diameter, which would come to lie against the second mantle section, cannot be introduced into the ring space due to the narrowing, and are thereby segregated out as scrap parts.

Furthermore, it can be practical if the position of a mantle surface of the second mantle section, which surface lies on the outside, and the position of a surface of the hose, and/or the position of a mantle surface of the first mantle section, which surface lies on the outside, is detected by means of a distance measurement device, at least at two measurements points that are axially spaced apart from one another. In this regard, it is advantageous that the position of the mantle surfaces or the position of the hose can be detected by means of the distance measurement device, before the pressing process, and that during the pressing process, the current degree of pressing can be detected, wherein the controller of the pressing apparatus can calculate the further forming steps on the basis of the current degree of pressing and of the desired degree of pressing.

Furthermore, it can be provided that a distance between the two surfaces in question is calculated from the position of the mantle surface of the second mantle section, which surface lies on the outside, and the position of the surface of the hose. It is advantageous, in this regard, that by means of calculating the distance of the position of the mantle surface of the second mantle section, which surface lies on the outside, and the position of the surface of the hose it can be determined to what extent the first mantle section and thereby also the hose can be deformed before the hose comes to lie against the second mantle section.

Furthermore, it can be provided that before deformation and/or during deformation of the first mantle section, through a first window opening and/or second window opening disposed in the second mantle section, the surface of the hose, which surface faces the window openings, is detected by means of a distance measurement device, and the deformation of the first mantle section is carried out as a function of the result of the detection of the surface of the hose carried out using the distance measurement device. It is advantageous, in this regard, that by means of this measure, the current degree of deformation of the first mantle section and/or of the hose can be constantly monitored during the pressing process, and this information can flow into the controller of the pressing apparatus.

An embodiment according to which it is provided that a profile sensor is used as a distance measurement device, which sensor detects at least the two measurement points, preferably multiple measurement points on a predetermined longitudinal region, during the pressing process, is also advantageous. In particular when using a profile sensor, two or more different detection points, spaced locally apart from one another, can be established, at which the position of the first mantle section and/or the position of the second mantle section and/or the position of the hose can be detected.

According to a further development, it is possible that during the pressing process, a wall thickness of the hose is calculated on the basis of the information regarding the current position of the pressing tool and on the basis of the measurement values of the position of the hose that faces the window openings, detected by the distance measurement device. It is advantageous, in this regard, that by means of this measure, the wall thickness of the hose can be precisely determined, wherein no separate method step is necessary for this purpose before the connector body is laid into the pressing apparatus. In particular, as a result the relatively great inaccuracies in terms of the wall thickness of the hose can be determined and taken into considerations as parameters during the pressing process. As a result, a continuous pressing quality can be achieved during multiple pressing processes.

Furthermore, it can be practical if the first mantle section is detected by means of the distance measurement device before the connection section of the hose is pushed into the ring space of the plug-in connector. It is advantageous, in this regard, that the position of the first mantle section can be detected by means of these measures.

Furthermore, it can be provided that the correct plug-in position of the connection section of the hose in the ring space is detected by means of the distance measurement device. In this regard, it is advantageous that it can be ensured, by means of this measure, that the pressing process is only started when the hose is correctly inserted in the ring space, and thereby the quality of pressing can be increased.

According to the invention, a plug-in connector is configured for use in a method as described above. The plug-in connector comprises a connector body, which connector body has a ring space for accommodating a connection section of a hose for liquid or gaseous media, wherein the ring space lies between a sleeve-shaped first mantle section, which surrounds a central longitudinal axis of the plug-in connector in ring shape, in cross-section, and a sleeve-shaped second mantle section of the plug-in connector, which surrounds the central longitudinal axis in ring shape, in cross-section, wherein the first mantle section is surrounded by the second mantle section, and the mantle sections are open toward one another at a second end section, and thereby a hose accommodation side of the connector body is formed. The second mantle section has a narrowing at its front edge of the hose accommodation side.

It is an advantage of the embodiment of the plug-in connector according to the invention that it is ensured, by means of the narrowing, that the connection section of the hose can be freely deformed during the pressing process, at least in the region of the ring space that is at a distance from the front edge, in the direction of the second mantle section, before the connection section of the hose comes to lie against the second mantle section.

According to a special embodiment, it is possible that the introduction width of the ring space is smaller than a main width of the ring space. It is advantageous, in this regard, that by means of this measure, the introduction of hoses that do not have the required dimensions can be prevented.

In accordance with an advantageous further development, it can be provided that the introduction width of the ring space amounts to between 50% and 99%, in particular between 70% and 95%, preferably between 88% and 92% of a main width of the ring space. An introduction width in this size range, in particular, is ideally suited for limiting the dimensions of the hose.

In particular, it can be advantageous if the narrowing is configured on an axial length of 1 mm to 20 mm, in particular of 2 m to 15 mm, preferably of 2 mm to 8 mm. A narrowing that extends over the length indicated can be produced in particularly simple and efficient manner.

Furthermore, it can be provided that the narrowing is configured to project by an overhang of 0.1 mm to 10 mm, in particular of 0.3 mm to 3 mm, preferably of 0.4 mm to 1 mm relative to an inside diameter of the second mantle section. An embodiment of the connector body with the size ratios described here is particularly well suited for fulfilling the Advantageous Effects.

Furthermore, it can be provided that a first window opening and a second window opening are formed in the second mantle section, wherein the first window opening is formed in the region of the narrowing. It is advantageous, in this regard that the window openings for detecting the surface of the hose or for detecting the surface of the first mantle section can be provided by means of a distance measurement device disposed on the pressing machine.

An embodiment according to which it can be provided that three first window openings and three second window openings are formed in the second mantle section, distributed over the circumference, is also advantageous, wherein the window openings are disposed at an angle of 120° relative to one another, in each instance, on the circumference of the second mantle section. It is advantageous, in this regard, that by means of this measure, the roundness or the precise shape of the connector body can be detected.

By means of a profile sensor, angles, steps, and positions can be detected and followed. For conversion of the detected data into common field bus systems, an output module can be provided. Using this module, the measurement results are output for evaluation or further processing, optionally by way of digital or analog modules. The profile data can be achieved by way of a laser line, for example, which is projected onto the surface of the measured object. The diffusely reflected light is projected onto a sensor matrix by way of a lens. The sensor calculates profile data from the camera image, and, directly from these data, calculates the relevant characteristic values. The characteristic values can then be passed on to a controller, directly by RS422 or in connection with the output module. Furthermore, it is also conceivable that switching signals directly evaluated with tolerances are output by the profile sensor.

Furthermore, according to the invention, a plug-in connector is formed, particularly for use in a road vehicle. The plug-in connector comprises a connector body, which connector body has a ring space for accommodating a connection section of a hose for liquid or gaseous media, wherein the ring space lies between a sleeve-shaped first mantle section, which surrounds a central longitudinal axis of the plug-in connector in ring shape, in cross-section, and a sleeve-shaped second mantle section of the plug-in connector, which surrounds the central longitudinal axis in ring shape, in cross-section, wherein the first mantle section is surrounded by the second mantle section, and the mantle sections are open toward one another at a second end section, and thereby a hose accommodation side of the connector body is formed, wherein a seal accommodation follows the first mantle section, which accommodation is also formed in the connector body, and in which accommodation a seal element is held. The seal element is held axially clamped in the seal accommodation.

It is an advantage of the embodiment of the plug-in connector according to the invention that the result can be achieved, by means of the axial clamping of the seal element in the seal accommodation, that the seal element has a particularly good seat in the seal accommodation. As a result, undesirable slipping of the seal element in the seal accommodation can be prevented. Thereby the position at which the sealing lip of the seal element interacts with a mating plug-in connector can be precisely established, so as to create a sealed connection between the plug-in connector and the mating plug-in connector.

Furthermore, it can be provided that a width of the seal element in the uninstalled state is greater than a width of the seal accommodation. By means of this measure, the result can be achieved that the seal element is clamped by means of the face wall and the second face wall of the seal accommodation during installation into the seal accommodation, and is elastically or also plastically deformed. In the installed state, the seal element is clamped as a result.

Furthermore, it can be provided that the seal accommodation is delimited by a face wall and a second face wall, wherein the seal accommodation has a narrowing in the direction toward the central longitudinal axis. By means of this measure, a particularly good seat of the seal element in the seal accommodation can be achieved, since the seal element is clamped more strongly in its inside than on its outside.

Furthermore, it can be provided that the narrowing is formed in that the second face wall is disposed at an angle to the face wall. By means of this measure, a particularly good seat of the seal element in the seal accommodation can be achieved, since the seal element is clamped more strongly in its inside than on its outside.

For a better understanding of the invention, it will be explained in greater detail using the following figures.

The figures show, in a greatly simplified, schematic representation, in each instance.

As an introduction, it should be stated that in the different embodiments described, the same parts are provided with the same reference symbols or the same component designations, wherein the disclosures contained in the entire description can be transferred analogously to the same parts having the same reference symbols or the same component designations. Also, the position information selected in the description, such as top, bottom, lateral, etc., refer to the figure directly being described and shown, and this position information must be transferred analogously to the new position in the event of a change in position.

Figure 1:
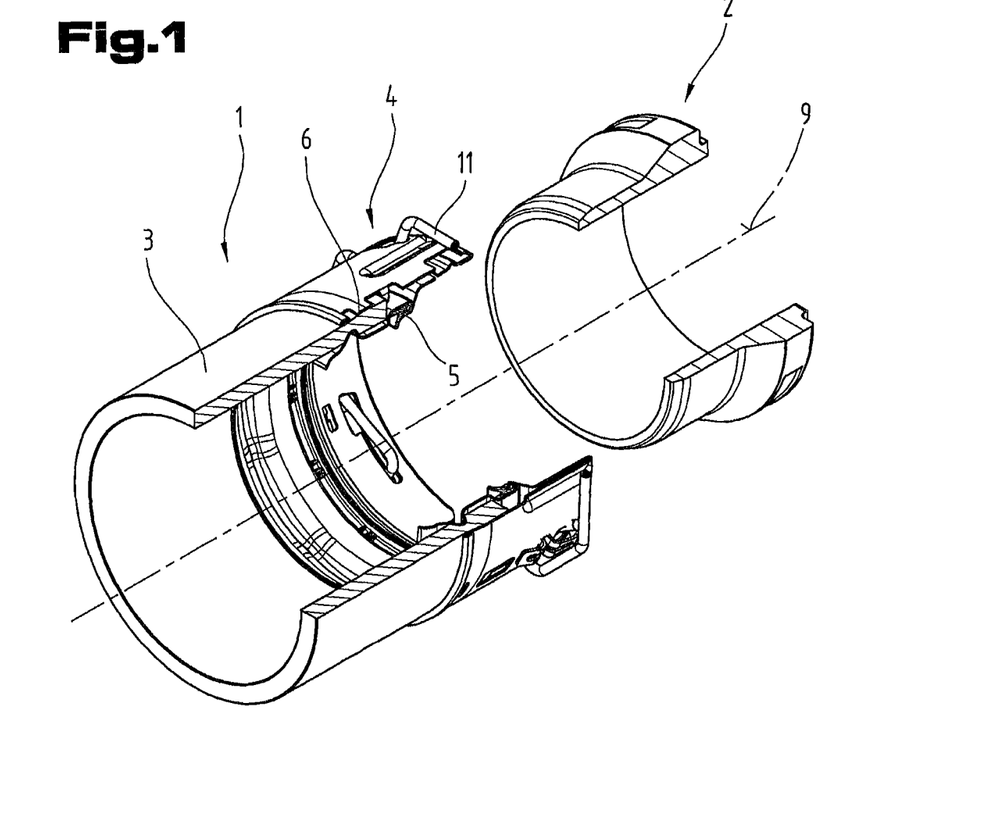
FIG. 1 a perspective representation of a plug module in quarter-section.

FIG. 1 shows a perspective view of a plug module 1, wherein this module is shown in a quarter-section. Furthermore, in FIG. 1 a mating plug-in connector 2 is shown schematically, which connector can be connected with the plug module 1. The interaction between plug module 1 and a mating plug-in connector 2 is sufficiently described in AT 509 196 B1.

In FIG. 1, the plug module 1 is shown in an assembled state. The plug module 1 comprises a hose 3, a plug-in connector 4, as well as a seal element 5 accommodated in the plug-in connector 4, which element serves for providing a seal between plug-in connector 4 and mating plug-in connector 2. The plug-in connector 4 comprises a connector body 6, which is preferably formed as a single-piece shaped part, for example as a deep-drawn part, in particular from a stainless steel sheet.

Figure 2:
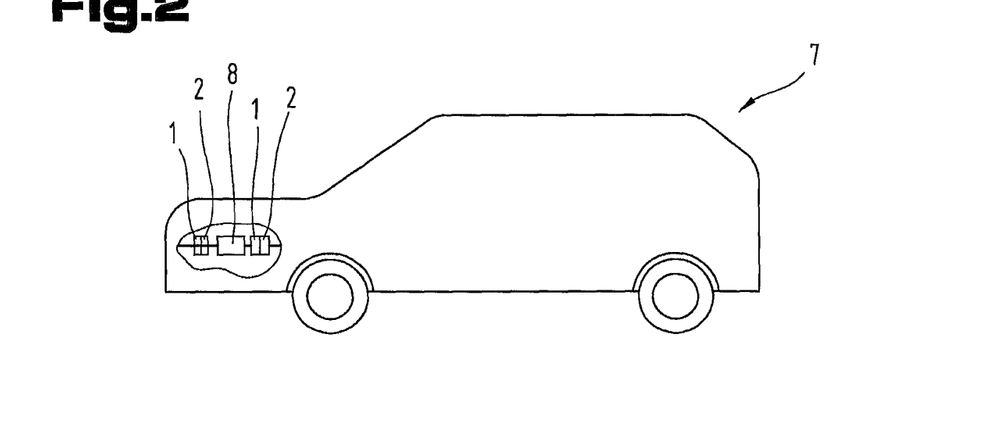
FIG. 2 a vehicle equipped with the plug module.

FIG. 2 shows a schematic representation of a vehicle 7 with an installed plug module 1 in accordance with FIG. 1. As can be seen in FIG. 2, the plug module 1 is preferably used in a vehicle 7, in particular in a road-use motor vehicle having an internal combustion engine. Specifically, the plug module 1 is used for connecting different components of the fresh-air feed to the internal combustion engine. For example, it can be provided that the plug module 1 with the corresponding mating plug-in connector 2 is provided for connecting two parts in the intake region of a turbocharger 8. Furthermore, it can also be provided that such a plug connection is used in the pressure side that goes out from the turbocharger 8, to connect two components.

Figure 3:
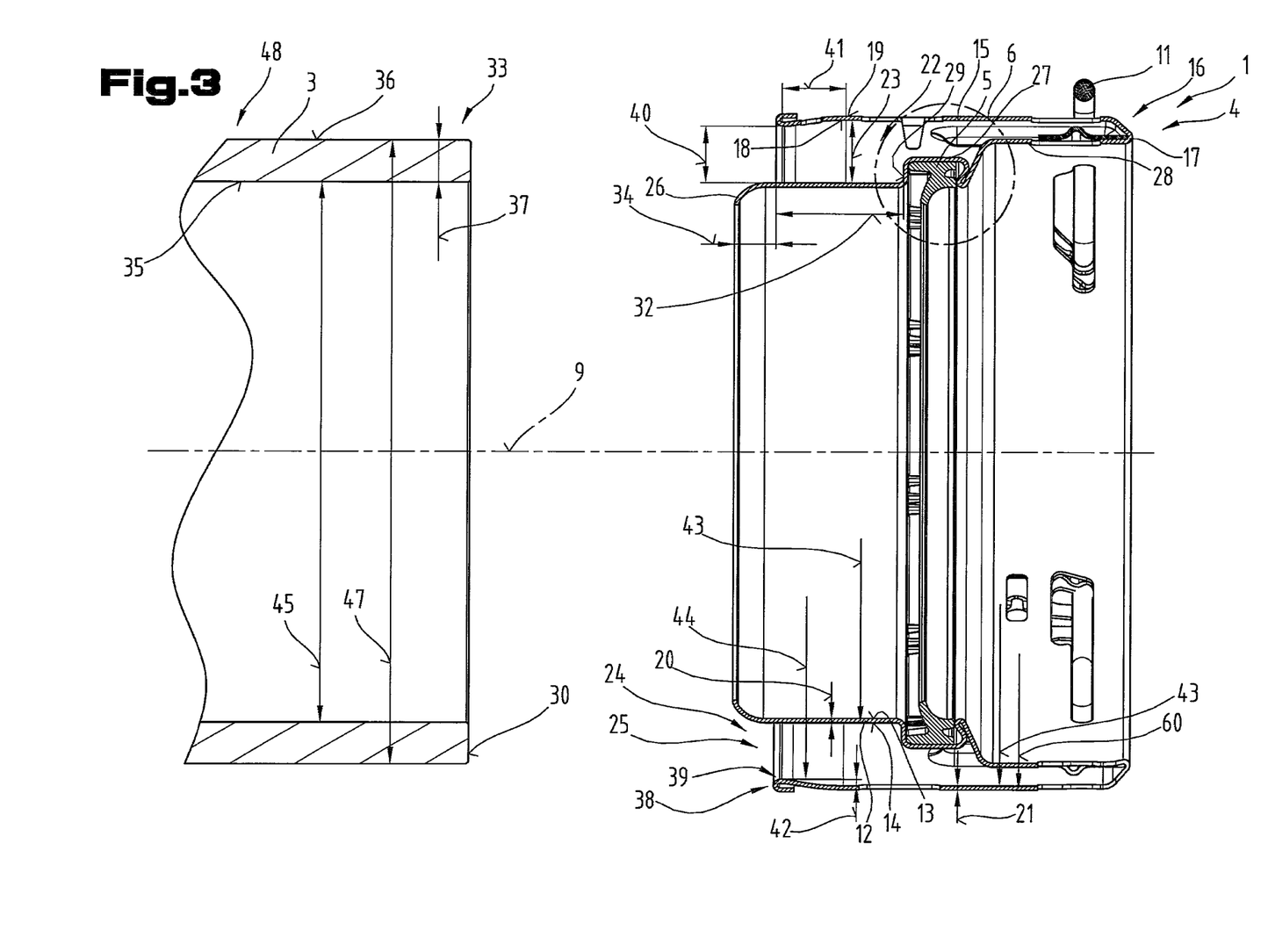
FIG. 3 a sectional representation of the plug module in an exploded view.

FIG. 3 shows a cross-section of the plug module 1 along a central longitudinal axis 9 of the plug-in connector 4. In order to be able to describe the individual components well, these are shown in an exploded view in FIG. 3.

As can be seen well in FIG. 3, the plug-in connector 4 comprises a spring element 11, by means of which the plug module 1 can be secured in its position relative to the mating plug-in connector 2 that is plugged into the plug module 1. The spring element 1 is designed in such a manner that it can be easily activated and deactivated, so that as necessary, the plug module 1 and the mating plug-in connector 2 can be separated from one another or connected with one another.

As can be seen in FIG. 3, a first mantle section 12 is formed on the connector body 6, which section surrounds the central longitudinal axis 9 of the plug-in connector 4 in sleeve shape. Stated in different words, the first mantle section 12 is a hollow cylinder having rotation symmetry.

The first mantle section 12 has a mantle surface 13 that lies on the inside, and a mantle surface 14 that lies on the outside. The first mantle section 12 is surrounded by a second mantle section 15, which is also configured with rotation symmetry with reference to the central longitudinal axis 9. The first mantle section 12 is connected with the second mantle section 15 at a first end section 16, by means of a first face wall section 17.

Just like the first mantle section 12, the second mantle section 15 also has a mantle surface 18 that lies on the inside, and a mantle surface 19 that lies on the outside.

The first mantle section 12 is delimited by its mantle surface 13 that lies on the inside and the mantle surface 14 that lies on the outside, and thereby a wall thickness 20 of the first mantle section 12 is obtained. The second mantle section 15 is also delimited by a mantle surface 18 that lies on the inside and a mantle surface 19 that lies on the outside, and thereby a wall thickness 21 of the second mantle section 15 is obtained.

By means of the spacing of the two mantle sections 12, 15 relative to one another, a ring space 22 is formed. The ring space 22 is delimited, particularly in the radial direction, by means of the mantle surface 14 of the first mantle section 12, which surface lies on the outside, and by means of the mantle surface 18 of the second mantle section 15, which surface lies on the inside.

The two mantle sections 12, 15 are open toward one another at a second end section 24 of the plug-in connector 4, and thereby a hose accommodation side 25 of the connector body 6 is obtained.

It can be provided that the first mantle section 12 has a chamfered edge 26, which is formed on the hose accommodation side 25 of the first mantle section 12. Such a chamfered edge 26 brings with it the advantage that the hose 3 can easily be pushed into the ring space 22.

Furthermore, it can be provided that a seal accommodation 27, which is also formed in the connector body 6, follows the first mantle section 12, viewed in the direction of the first end section 16 of the plug-in connector 4. The seal element 5 can be accommodated in such a seal accommodation 27. Furthermore, it can be provided that a third mantle section 28, which serves to accommodate the mating plug-in connector 2, follows the seal accommodation 27. The face wall section 17, which connects the third mantle section 28 with the second mantle section 15, can follow the third mantle section 28. By means of this structure or this relationship, the first mantle section 12 is connected with the second mantle section 15 by way of the third mantle section 28 and the face wall section 17.

Preferably, the connector body 6 is produced using a deep-drawing method, wherein all the wall thicknesses of the mantle sections of the connector body 6 are approximately the same.

As can be seen in the view in FIG. 3, it can also be practical that the seal accommodation 27 has a face wall 29, which follows the first mantle section 12. Here, the face wall 29 can be curved, particularly in the direction toward the second mantle section 15, and thereby an accommodation depression for the seal element 5 is obtained.

The configuration of the face wall 29 furthermore brings with it the advantage that during the course of assembly of the plug module 1, the hose 3 can be pushed so far into the ring space 22 until it lies against the face wall 29. Thereby the face wall 29 can also serve to facilitate the positioning process of the hose 3. Stated in different words, the face wall 29 serves as an axial positioning stop for a face surface 30 of the hose 3.

An axial expanse 32 of the ring space 22 is preferably selected to be so great that the ring space 22 has a sufficient length so as to accommodate the hose 3, in particular a connection section 33 formed on the latter.

Furthermore, it can be provided that the first mantle section 12 extends farther in the direction of the hose accommodation side 25 than the second mantle section 15, and thereby projects a by certain distance 34 relative to the second mantle section 15, seen in the axial direction.

As is further evident from FIG. 3, the hose 3 has an inner mantle surface 35 and an outer mantle surface 36. A wall thickness 37 of the hose 3, which results from the inner mantle surface 35 and the outer mantle surface 36, is selected to be so great that the hose 3 can withstand the pressure that occurs in the hose 3. The wall thickness 37 of the hose 3 can amount to between 1 mm and 20 mm, in particular between 2 mm and 8 mm, preferably between 3 mm and 5.5 mm.

The second mantle section 15 of the connector body 6 has a narrowing 39 at a front edge 38 of the hose accommodation side 25. By means of the narrowing 39, it is ensured that the connection section 33 of the hose 3 can be freely deformed in the direction of the second mantle section 15 during the pressing process, at least in the region of the ring space 22 that is at a distance from the front edge 38, before the connection section 33 of the hose 3 comes to lie against the second mantle section 15.

By means of the narrowing 39, an introduction width 40 of the ring space 22 occurs, which width is smaller than the main width 23 of the ring space 22. Because the introduction width 40 of the ring space 22 is delimited by the narrowing 39, which is formed in the second mantle section 15, introduction of incorrectly dimensioned hoses into the ring space 22 can be prevented to the greatest possible extent.

Furthermore, it can be provided that the narrowing 39 extends on an axial length 41. In this regard, it is conceivable that the narrowing 39 has a continuously changing cross-section and is therefore configured conically. A narrowing 39 configured in this manner can be produced easily, in terms of production technology. Furthermore, it is also conceivable that the narrowing 39 is configured in arc shape. In yet another variant, it is also conceivable that the narrowing 39 is formed by a gradation.

However, the shape is not decisive for the functionality of the narrowing 39, but rather it is solely and exclusively required that the narrowing 39 is configured to project by an excess dimension 42 relative to an inside diameter 43 of the main region of the second mantle section 15.

In particular, it is provided that the second mantle section 15 has a smaller inside diameter 44 in the region of the narrowing 39 than the inside diameter 43 of the main region.

An inside diameter 45 of the hose 3 is selected to be approximately as great as an outside diameter 46 of the first mantle section 12. It is advantageous if the two diameters 45, 46 are coordinated with one another in such a manner that the hose 3 can easily be pushed onto the first mantle section 12. In the exemplary embodiment shown, the inside diameter 45 of the hose 3 amounts to approximately 52 mm.

An outside diameter 47 of the hose 3 is preferably selected to be so great that it is smaller than an inside diameter 44 of the second mantle section 15 in the region of the narrowing 39. As a result, the hose 3 can easily be pushed into the ring space 22 of the connector body 6 during assembly of the plug module 1. By means of the configuration, according to which the second mantle section 15 has a smaller inside diameter 44 in the region of the narrowing 39 than the inside diameter 43 of the main region, it is ensured that in the pushed-in state, the hose 3 does not lie against the second mantle section 15 in its main region.

Furthermore, it can be provided that the hose 3, in the region of its connection section 33, has a greater or smaller wall thickness 37 than in a rear hose section 48.

Figure 4:
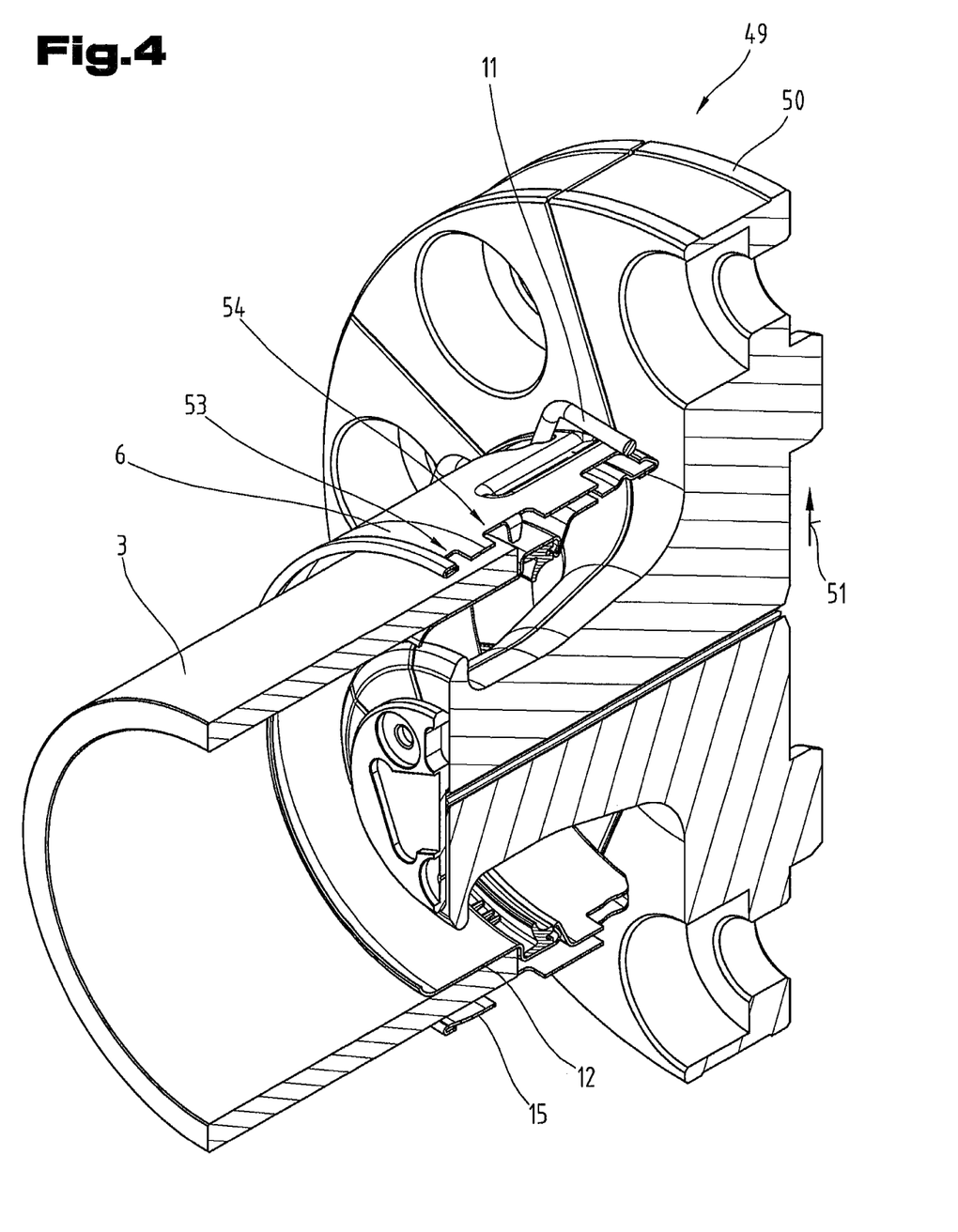
FIG. 4 a perspective sectional representation of the plug module according to FIG. 3 in an assembled position with a pressing machine.
Figure 5:
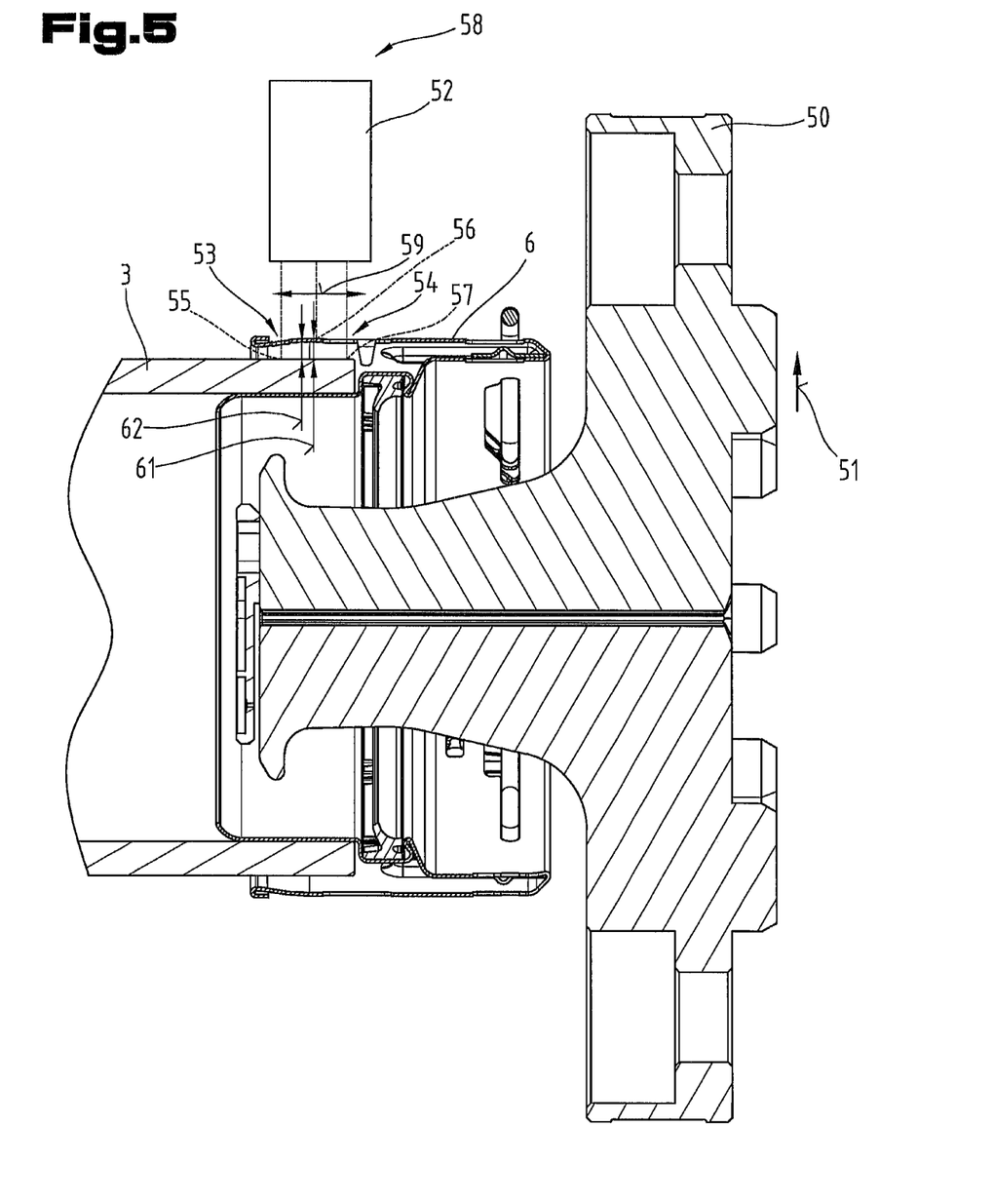
FIG. 5 a sectional representation of the plug module in the unpressed state, and the pressing machine in the rest position.

FIG. 4 shows the plug module 1 together with a pressing machine 49, which serves for connecting the hose 1 with the plug-in connector 4, in a perspective sectional representation, and FIG. 5 shows these components in a conventional sectional representation, wherein once again, the same reference symbols or component designations are used for the same parts as in the previous FIGS. 1 to 3. In order to avoid unnecessary repetition, reference is made to the detailed description in the previous FIGS. 1 to 3, i.e. this is pointed out.

In FIGS. 4 and 5, a first method step for assembly of the plug module 1 is shown, wherein the hose 3 is not yet pressed together with the plug-in connector 4.

Figure 6:
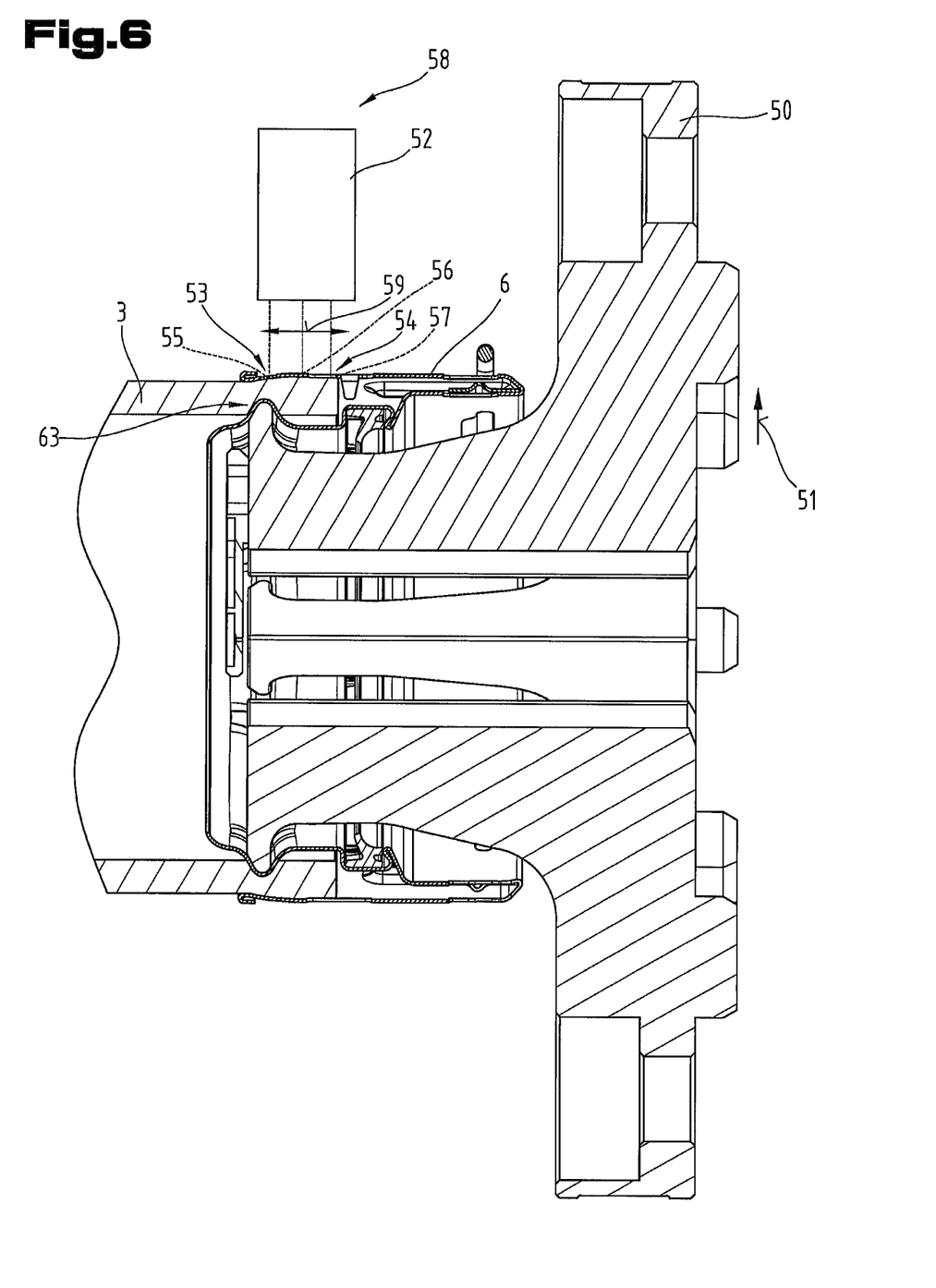
FIG. 6 a sectional representation of the plug module in the pressed state, and the pressing machine in the working position.

FIG. 6 shows the plug module 1 together with the pressing machine 49 in a perspective sectional representation, wherein once again, the same reference symbols or component designations as in the previous FIGS. 1 to 5 are used for the same parts. In order to avoid unnecessary repetition, reference is made to the detailed description in the previous FIGS. 1 to 5, i.e. this is pointed out.

In FIG. 6, a further method step for assembly of the plug module 1 is shown, wherein in this representation, the hose 3 is pressed together with the plug-in connector 4 in straight manner.

In the following, assembly of the plug module 1 will be described using a combined look at the representations in FIGS. 3 to 6.

The pressing machine 49 comprises a pressing tool 50, by means of which the first mantle section 12 of the connector body 6 can be deformed, and thereby the pressed connection of the plug module 1 can be produced. The pressing tools 50 are disposed on the pressing machine 49 so as to be displaceable in the radial direction 51.

In a first method step for production of the plug module 1, the connector body 6 is pushed onto the pressing tool 50 of the pressing machine 49 and thereby prepared for the pressing process. In this regard, the connector body 6 is pushed onto the pressing tool 50 in such a manner that the ring space 22 is freely accessible, so that the hose 3 can be pushed into the latter. Subsequently, in a second method step, the connection section 33 of the hose 3 is pushed into the ring space 22 of the connector body 6.

To check the correct position of the hose 3, a distance measurement device 52 can be provided, which can detect the presence of the hose 3. In particular, it can be provided that a first window opening 53 and/or a second window opening 54 is/are disposed in the second mantle section 15 of the connector body 6, through which the measurement beam of the distance measurement device 52 can penetrate into the ring space 22, and thereby can detect the position of the mantle surface 14 of the first mantle section 12, which surface lies on the outside, or the position of the outer mantle surface 36 of the hose 3.

In particular, it can be provided that a first measurement point 55 can be detected through the first window opening 53. The first measurement point 55 can lie on the outer mantle surface 36 of the hose 3 or on the mantle surface 14 of the first mantle section 12, which surface lies on the outside, depending on whether or not a hose 3 is inserted into the ring space 22. Furthermore, a second measurement point 55 can be detected by the distance measurement device 52, which is able to detect the position of the mantle surface 19 of the second mantle section 15, which surface lies on the outside.

Furthermore, it can be provided that the distance measurement device 52 measures into the ring space 22 through the second window opening 54. In this regard, it can be provided that a third measurement point 57 is detected, wherein in the case of the third measurement point 57, analogous to the first measurement point 55, the position of the hose 3 or the position of the first mantle section 12 can be detected. In particular, it can be provided that the distance measurement device 52 is configured in the form of a profile sensor 58.

Furthermore, it can be provided that a plurality of measurement points is detected by the distance measurement device 52 in a predetermined longitudinal region 59.

Correct positioning of the hose 3 can be determined, in particular, by means of the third measurement point 57. This can be implemented in that in the region of the third measurement point 57, it is evaluated whether the detected distance of the third measurement point 57 lies on the hose 3 or on the first mantle section 12. If the third measurement point 57 lies on the hose 3, then this is an indication that the hose 3 is correctly inserted into the connector body 6.

Furthermore, it is conceivable that even before insertion of the hose 3, the first measurement point 55 and/or the second measurement point 56 and/or the third measurement point 57 is/are detected, and thereby the correct position of the connector body 6 on the pressing tool 50 can be checked. In particular, in this way the result can be achieved that an outside diameter 46 of the first mantle section 12 can be detected.

After insertion of the hose 3, an outside diameter 47 of the hose 3 can be detected by means of the distance measurement device 52. Furthermore, an outside diameter 60 of the second mantle section 15 can be detected.

A distance 61 can be calculated from the position of the mantle surface 19 of the second mantle section 15, which surface lies on the outside, and the position of the outer mantle surface 36 of the hose 3. The distance 61 particularly corresponds to half the difference in diameter of the outside diameter 60 of the second mantle section 15 from the outside diameter 47 of the hose 3. If the wall thickness 21 of the second mantle section 15 is furthermore deducted from this distance 61, this results in a free space 62 between the mantle surface 18 of the second mantle section 15, which surface lies on the inside, and the outer mantle surface 36 of the hose 3. This free space 62 is the distance by which the hose 3 must at least be deformed before it comes to lie against the second mantle section 15.

In an alternative embodiment variant, it can also be provided that the hose 3, in a first method step, is inserted into the ring space 22 of the connector body 6, and only in the second method step, the connector body 6 together with the inserted hose 3 is pushed onto the pressing tool 50.

If the connector body 6 is correctly positioned on the connector body 6, and the hose 3 is correctly inserted in the ring space 22 of the connector body 6, then the pressing process for connecting the hose 3 with the plug-in connector 4 can be started. In this regard, the pressing tools 50 are moved outward in the radial direction 51 until they lie against a mantle surface 13 of the first mantle section 12, which surface lies on the inside.

Subsequently, the first mantle section 12 is deformed by the pressing tools 50, in the radial direction 51, in the direction of the second mantle section 15. In this regard, the inner mantle surface 35 of the hose 3 comes to lie against the mantle surface 14 of the first mantle section 12, which surface lies on the outside, and thereby the hose 3 is also deformed. In the pressing machine 49, a measurement apparatus is provided, by means of which the position of the pressing tools 50 can be precisely detected at every point in time. As a result, i.e. by means of knowledge of the wall thickness 20 of the first mantle section 12, the position of the mantle surface 14 of the first mantle section 12, which surface lies on the outside, can also be precisely determined at every point in time during the pressing process.

If the mantle surface 14 of the first mantle section 12, which surface lies on the outside, now lies against the inner mantle surface 35 of the hose 3, then the wall thickness 37 of the hose 3 can also be calculated by means of the deformation of the hose 3, by means of the first measurement point 55, which detects the outer mantle surface 36 of the hose 3. This calculation of the wall thickness 37 of the hose 3 can serve for determining the required degree of forming of the hose 3 for a sufficiently tight pressing connection of the hose 3 in the connector body 6.

By means of constant detection of the first measurement point 55 and/or of the third measurement point 57, it can also be determined when the outer mantle surface 36 of the hose 3 comes to lie against the mantle surface 18 of the second mantle section 15, which surface lies on the inside.

Any further deformation of the first mantle section 12 after this point in time leads to elastic and/or plastic deformation of the hose 3 and thereby to squeezing of the hose 3. In particular, the hose 3 is deformed to such an extent that, as can be seen well in FIG. 6, it has a constriction 63, which serves for holding the hose in place.

After completion of the pressing process, the pressing tools 50 can be moved inward once again, in the radial direction 51, so as to release the pressed plug module 1 for removal.

Figure 7:
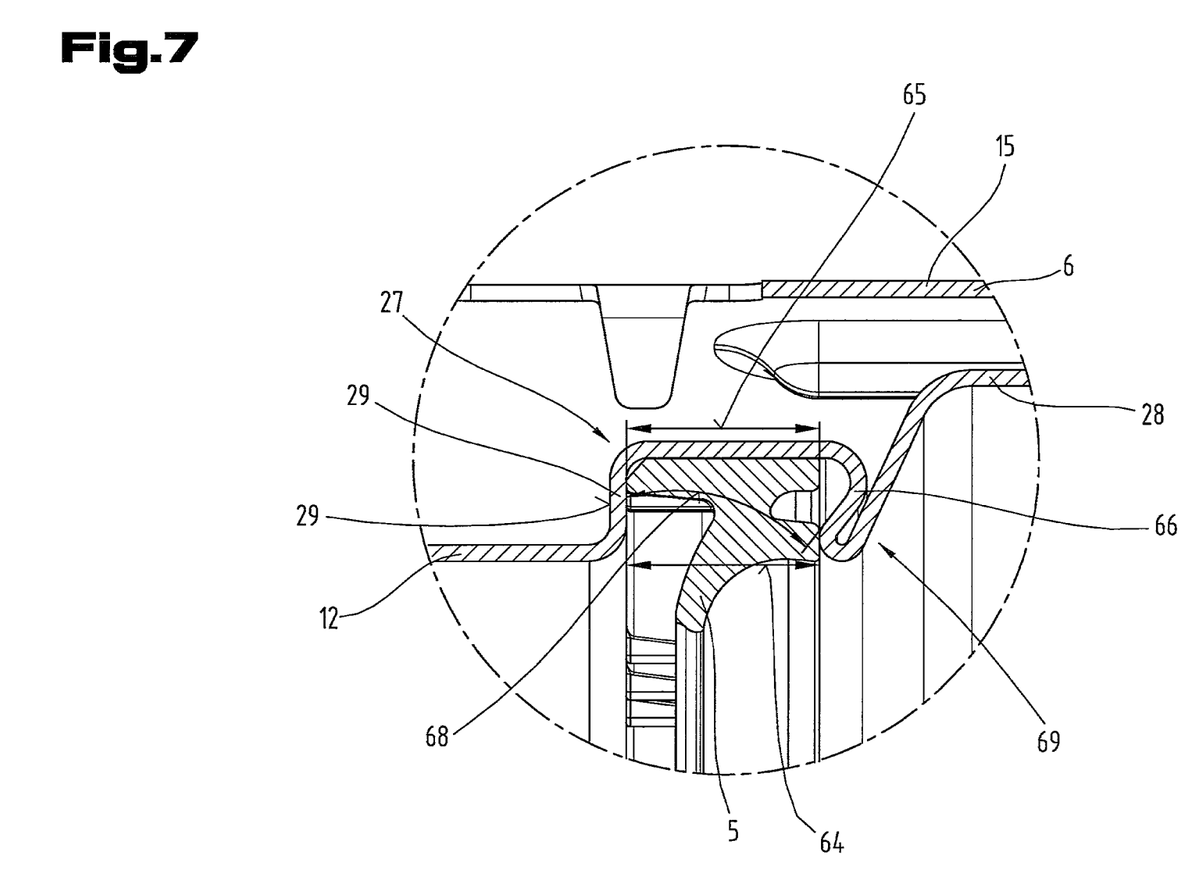
FIG. 7 a sectional representation of a detail of the seal element accommodated in the seal accommodation.

FIG. 7, in a further exemplary embodiment, shows a detail of the seal accommodation 27 of the plug module 1 in a perspective sectional representation, wherein once again, the same reference symbols or component designations as in the previous FIGS. 1 to 6 are used for the same parts. In particular, the detail shown in FIG. 7 is marked in FIG. 3 to facilitate orientation. In order to avoid repetition, reference is made to the detailed description in the previous FIGS. 1 to 6, i.e. this is pointed out.

As can be seen in FIG. 7, it can be provided that the seal element 5 is accommodated in the seal accommodation 27 in axially clamped manner. This can be achieved, in particular, in that a width 64 of the seal element 5 in the uninstalled state is greater than a width 65 of the seal accommodation 27. Due to the elasticity of the seal element 5, this element can be inserted into the seal accommodation 27 in spite of the excess dimension, wherein during installation, the seal element 5 is essentially deformed. After installation of the seal element 5 in the seal accommodation 27, the width 64 of the seal element 5 and the width 65 of the seal accommodation 27 are therefore equal in size.

The excess dimension of the width 64 of the uninstalled seal element 5 as compared with the width 65 of the seal accommodation 27 can amount to between 3 mm and 0.01 mm, in particular between 2 mm and 0.1 mm, preferably between 1.5 mm and 0.3 mm.

In particular, it can be provided that the seal accommodation 27 is delimited by the face wall 29 and a second face wall 66, wherein the seal accommodation 27 has a narrowing 67 in the direction toward the central longitudinal axis 9.

To form the narrowing 67, it can be provided that the face wall 29 is disposed at a right angle to the first mantle section 12. The second face wall 66 can be disposed at an angle 68 to the face wall 29. Stated in different words, the face wall 29 and the second face wall 66 do not run parallel in such an embodiment variant. The angle 68 can amount to between 0.1° and 60°, in particular between 10° and 50°, preferably between 30° and 45°. By means of this measure, the seat of the seal element 5 in the seal accommodation 27 can be improved.

Alternatively to this, it can also be provided that the second face wall 66 is disposed at a right angle to the first mantle section 12, and the face wall 29 is disposed at an angle 68 to the second face wall 66.

In yet another embodiment variant, it can also be provided that not only the face wall 29 but also the second face wall 66 are disposed at an angle 68 to the first mantle section 12, which deviates from a right angle, so that the narrowing is formed.

Furthermore, it can also be provided that not only the face wall 29 but also the second face wall 66 is disposed at a right angle to the first mantle section 12, so that no narrowing is formed. In the case of this embodiment variant, clamping of the seal element 5 in the seal accommodation 27 can be achieved by means of the excess dimension of the seal element 5.

Furthermore, it can be provided that the second face wall 66 is configured in the form of a loop 69. As a result, the needed space requirement for the second face wall 66 can be as low as possible.

The exemplary embodiments show possible embodiment variants, wherein at this point, it should be noted that the invention is not restricted to the embodiment variants that are specifically shown, but rather also various combinations of the embodiment variants with one another are possible, and this variation possibility lies within the ability of a person skilled in the art and working in this technical field, on the basis of the teaching for technical action provided by the present invention.

The scope of protection is determined by the claims. However, the description and the drawings should be referred to for interpreting the claims. Individual characteristics or combinations of characteristics of the different exemplary embodiments that are shown and described, in themselves can represent independent inventive solutions. The task on which the independent inventive solutions are based can be derived from the description.

All information regarding value ranges in the present description should be understood to mean that these also include any and all partial ranges of them; for example, the statement 1 to 10 should be understood to mean that all partial ranges, proceeding from the lower limit 1, and the upper limit 10 are also included, i.e. all partial regions begin with a lower limit of 1 or greater and end at an upper limit of 10 or less, e.g. 1 to 1.7, or 3.2 to 8.1, or 5.5 to 10.

For the sake of good order, it should be pointed out, in conclusion, that for a better understanding of the structure, some elements were shown not to sale and/or enlarged and/or reduced in size.

REFERENCE SYMBOL LISTING 1 plug module
2 mating plug-in connector
3 hose
4 plug-in connector
5 seal element 6 connector body
7 vehicle
8 turbocharger
9 longitudinal axis of the plug-in connector
10 [no entry]
11 spring element
12 first mantle section
13 mantle surface that lies on the inside
14 mantle surface that lies on the outside
15 further mantle section
16 first end section of plug-in connector
17 face wall section
18 mantle surface that lies on the inside
19 mantle surface that lies on the outside
20 wall thickness of first mantle section
21 wall thickness of second mantle section
22 ring space
23 main width of ring space
24 second end section of plug-in connector
25 hose accommodation side
26 chamfered edge
27 seal accommodation of plug-in connector
28 third mantle section
29 face wall of seal accommodation
30 face surface of hose
31 face wall of first mantle section
32 axial expanse of ring space
33 connection section
34 distance
35 inner mantle surface of hose
36 outer mantle surface of hose
37 wall thickness of hose
38 front edge
39 narrowing
40 introduction width of ring space
41 axial length of narrowing
42 excess dimension of narrowing
43 inside diameter of main region of second mantle section
44 inside diameter of narrowing of second mantle section
45 inside diameter of hose
46 outside diameter of first mantle section
47 outside diameter of hose
48 rear hose section
49 pressing machine
50 pressing tool
51 radial direction
52 distance measurement device
53 first window opening
54 second window opening
55 first measurement point
56 second measurement point
57 third measurement point
58 profile sensor
59 longitudinal region of measurement points
60 outside diameter of second mantle section
61 distance between hose-second mantle section
62 free space
63 constriction
64 width of seal element
65 width of seal accommodation
66 second face wall
67 narrowing
68 angle
69 loop

The invention claimed is:

1. A method for connecting a connection section (33) of a hose (3) for liquid or gaseous media with a plug-in connector (4), wherein the plug-in connector (4) comprises a connector body (6), which connector body (6) has a ring space (22), which is formed by a sleeve-shaped first mantle section (12) of the plug-in connector (4), which section surrounds a central longitudinal axis (9) in ring shape, in cross-section, and a sleeve-shaped second mantle section (15) of the plug-in connector (4), which section surrounds the central longitudinal axis (9) in ring shape, in cross-section, wherein the first mantle section (12) is surrounded by the second mantle section (15), and the mantle sections (12, 15) are open toward one another at a second end section (24), whereby a hose accommodation side (25) of the connector body (6) is formed, wherein in a first method step, the connection section (33) of the hose (3) is pushed into the ring space (22) of the plug-in connector (4) from the hose accommodation side (25) of the connector body (6), and positioned there;

in a second method step, a pressing tool (50) deforms the first mantle section (12) of the connector body (6), with simultaneous deformation of the connection section (33) of the hose (3), which section lies between the first mantle section (12) and the second mantle section (15), in the direction toward the second mantle section (15), and thereby the connection section (33) of the hose (3) is clamped between the first mantle section (12) and the second mantle section (15);

wherein the second mantle section (15) has a narrowing (39) at a front edge (38) of the hose accommodation side (25), whereby it is ensured that the connection section (33) of the hose (3) is freely deformed in the direction of the second mantle section (15) during the pressing process, at least in the region of the ring space (22) that is at a distance from the front edge (38), before the connection section (33) of the hose (3) comes to lie against the second mantle section (15);

wherein the position of a mantle surface (19) of the second mantle section (15), which surface lies on the outside, is detected by means of a distance measurement device (52), at at least two measurement points that lie axially apart from one another, and the position of the outer mantle surface (36) of the hose (3) and/or the position of a mantle surface (14) of the first mantle section (12), which surface lies on the outside, is detected.

2. The method according to claim 1, wherein a distance (61) between the two surfaces (19, 36) is calculated from the position of the mantle surface (19) of the second mantle section (15), which surface lies on the outside, and the position of an outer mantle surface (36) of the hose (3).

3. The method according to claim 1, wherein before deformation and/or during deformation of the first mantle section (12), the outer mantle surface (36) of the hose (3), which surface faces the window openings (53, 54), is detected by means of a distance measurement device (52), through a first window opening (53) and/or a second window opening (54) disposed in the second mantle section (15), and the deformation of the first mantle section (12) is carried out as a function of the result of the detection of the outer mantle surface (36) of the hose (3), which detection is carried out using the distance measurement device (52).

4. The method according to claim 1, wherein a profile sensor (58) is used as a distance measurement device (52), which sensor detects at least the two measurement points (55, 56), preferably multiple measurement points on a predetermined longitudinal range (59) during the pressing process.

5. The method according to claim 1, wherein during the pressing process, a wall thickness (37) of the hose (3) is calculated on the basis of the information regarding the current position of the pressing tool (50), and on the basis of the measurement values detected by the distance measurement device (52), of the position of the outer mantle surface (36) of the hose (3), which surface faces the window openings (53, 54).

6. The method according to claim 1, wherein before the connection section (33) of the hose (3) is pushed into the ring space (22) of the plug-in connector (4), the first mantle section (12) is detected by means of the distance measurement device (52).

7. The method according to claim 1, wherein the correct insertion position of the connection section (33) of the hose (3) in the ring space (22) is detected by means of the distance measurement device (52).

* * * * *